United States Patent [19]

Dickie et al.

[11] 4,069,364

[45] Jan. 17, 1978

| [54] | RADIATION POLYMERIZED COATED ARTICLE AND METHOD OF MAKING SAME |
|---|---|
| [75] | Inventors: Ray A. Dickie, Birmingham; Joseph C. Cassatta, Taylor, both of Mich. |
| [73] | Assignee: Ford Motor Company, Dearborn, Mich. |
| [21] | Appl. No.: 643,425 |
| [22] | Filed: Dec. 22, 1975 |

Related U.S. Application Data

[62] Division of Ser. No. 537,736, Dec. 31, 1974, Pat. No. 3,957,918.

[51] Int. Cl.$^2$ .................. B32B 15/08; B32B 27/30; B32B 31/28; B05D 3/06
[52] U.S. Cl. .................. 428/276; 156/272; 204/159.16; 260/836; 260/859 R; 260/885; 260/886; 427/44; 427/54; 427/250; 427/404; 427/407 R; 428/463; 428/510; 428/522
[58] Field of Search .............. 428/276, 463, 520, 522, 428/510, 514, 442; 427/44, 54, 250, 404, 407 R; 204/159.15, 159.16; 260/836, 885, 886, 859 R; 156/272

[56] References Cited

U.S. PATENT DOCUMENTS

| 2,046,886 | 7/1936 | Strain .................. 428/463 X |
|---|---|---|
| 3,869,341 | 3/1975 | Gotoda et al. .................. 427/44 X |
| 3,895,171 | 7/1975 | Deamud et al. .................. 428/461 |
| 3,897,295 | 7/1975 | Dowbenko et al. .................. 204/159.16 X |
| 3,935,330 | 1/1976 | Smith et al. .................. 204/159.15 X |
| 3,953,643 | 4/1976 | Cheung et al. .................. 427/407 R |
| 3,956,535 | 5/1976 | Lozier .................. 427/404 X |
| 3,987,127 | 10/1976 | Dickie et al. .................. 427/44 X |
| 4,000,349 | 12/1976 | Dickie et al. .................. 427/44 |

*Primary Examiner*—Harold Ansher
*Attorney, Agent, or Firm*—Roger L. May; Keith L. Zerschling

[57] ABSTRACT

A radiation polymerizable protective coating composition or paint, coated articles bearing such a protective radiation polymerizable paint which, on a non-polymerizable solvent, pigment, initiator and particulate filler-free basis, consists essentially of a binder solution of: (1) between about 90 and about 10 parts of a saturated, thermoplastic vinyl polymer prepared from at least about 85 weight percent of monofunctional vinyl monomers; (2) between about 10 and about 90 parts of vinyl solvent monomers for said vinyl polymer, at least about 10 weight percent, preferably at least about 30 weight percent, of said solvent monomers being selected from the group consisting of divinyl monomers, trivinyl monomers, tetravinyl monomers and mixtures thereof; and (3) between about 1.0 and about 15.0 parts per 100 parts of the total of said thermoplastic vinyl polymer and said vinyl solvent monomers of a triester of phosphoric acid bearing one or more sites of vinyl unsaturation. The composition exhibits excellent quality and good adhesion to a variety of substrates, in particular metals, including vapor deposited metals. Preferred articles bearing such a coating are prepared by: applying a base coat to a substrate and curing the same; vapor depositing a coating of metal over the surface of the base coat; and applying to and curing on the surface of the deposited metal the radiation polymerizable topcoat, preferably with little or no pigment contained therein.

19 Claims, No Drawings

RADIATION POLYMERIZED COATED ARTICLE AND METHOD OF MAKING SAME

This is a Division of application Ser. No. 537,736, filed Dec. 31, 1974, now U.S. Pat. No. 3,957,918.

This application relates to: radiation polymerizable coatings of excellent quality which display unusually good adhesion to a variety of substrates; coated articles bearing such a radiation polymerizable coating; and processes for preparing such articles.

More particularly, this application relates to radiation polymerizable coating compositions which are particularly suited as corrosion and abrasion resistant protection coatings for vapor deposited metal surfaces as well as to articles comprising such a vapor deposited metal surface bearing the protective coating and processes for preparing the same. Such protectively coated, vapor deposited metal bearing articles are a particularly preferred embodiment of the invention since they are suitable for use as a substitute for plated metal surfaces used for trim or brightwork on the exterior of automobiles.

A number of radiation polymerizable coatings disclosed in the prior art literature display excellent quality and addesion properties when applied to a variety of substrates. While the outstanding properties of those compositions effectively solve many of the problems associated with providing protective coatings for a variety of substrates, they do not provide adequate corrosion and water resistance when applied to substrates bearing vapor deposited metals to allow exterior automotive use of vapor metallized materials.

The coating compositions of this invention solve such problems by providing improved corrosion and water resistance.

BRIEF DESCRIPTION OF THE INVENTION

The coating compositions of this invention, on a non-polymerizable solvent, pigment, initiator and particulate filler-free basis consist essentially of a binder solution of: (1) between about 90 and about 10 parta of a saturated, thermoplastic vinyl polymer prepared from at least about 85 weight percent of monofunctional vinyl monomers; (2) between about 10 and about 90 parts of vinyl solvent monomers for said vinyl polymer, at least about 10 weight percent, preferably at least about 30 weight percent, of said solvent monomers being selected from the group consisting of divinyl monomers, trivinyl monomers, tetravinyl monomers and mixtures thereof; and (3) between about 1.0 and about 15.0 parts per 100 parts of the total of said thermoplastic, vinyl polymer and said vinyl solvent monomers of a triester of phosphoric acid bearing one or more sites of vinyl unsaturation and having the formula:

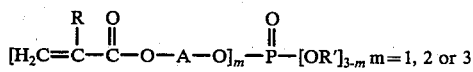

where:
R = H, Cl or $CH_3$
A = $C_nH_{2n}$, $2 \leq n \leq 6$
R' = $C_1$ to $C_4$ alkyl or $C_1$ to $C_4$ chloro- or bromo-alkyl These coating compositions, which are radiation polymerizable, are preferably cured by exposure to ionizing radiation or ultraviolet radiation. The coating compositions provide an excellent protective surface which adheres well to a variety of substrates, in particular metals and vapor deposited metals, and, thus, can be employed in the preparation of a wide variety of articles. One such preferred article or material, which is useful as a substitute for metal plated materials used for trim or brightwork on the exterior of automobiles, is prepared by: (1) vapor depositing a metal layer on the surface of a prepared substrate; (2) coating the deposited metal surface with the radiation polymerizable coating of this invention; and (3) curing the coating by exposure to radiation, preferably ionizing radiation or ultraviolet radiation.

The radiation polymerizable coating composition and the coated articles formed therefrom as well as the processes for preparing the same will be described more fully in the detailed description of the invention which follows.

DETAILED DESCRIPTION OF THE INVENTION

I. Radiation Polymerizable Coating Composition

In this application, the term "paint" is meant to include finely divided pigment and/or particulate filler as well as other additives in a film-forming, resin comprising, binder or the binder without pigment, particulate filler, and other additives. Thus, the binder which is ultimately converted to a weather and wear-resistant film can be all or virtually all that is used to form the film, or it can be a vehicle for pigment and other additives.

Prior art radiation polymerizable paints conventionally comprise a solution of an alpha-beta olefinically unsaturated prepolymer in vinyl monomers. Exemplary of such prior art radiation polymerizable coatings are those disclosed in the following U.S. Pat. Nos.: 3,437,512; 3,437,513; 3,437,514; 3,528,844; 3,542,586; 3,582,587; 3,560,245; 3,577,262; 3,577,263; 3,577,264; 3,577,265; 3,585,526; 3,586,527; 3,586,528; 3,586,529; 3,586,530; 3,586,531; 3,591,626; 3,595,687; 3,632,399; 3,632,400; 3,641,210; 3,642,939; 3,649,337; 3,650,811; 3,650,812; 3,650,813; 3,660,143; 3,660,144; 3,660,145; 3,660,371; and 3,679,447. In these patents, the alpha-beta olefinically unsaturated prepolymer is defined as having olefinic unsaturation provided by an alpha-beta olefinically unsaturated monomer; or more particularly, as a resin having pendant unsaturation or olefinic unsaturation between the two terminal carbons of a polymer side chain. It is this pendant unsaturation which permits the prepolymer to not only polymerize with vinyl solvent monomers, but also to crosslink and thus form a tough solvent and weather-resistant coating. Other paints which are radiation polymerizable at low radiation dosages and which comprise monounsaturated monomers and a saturated prepolymer containing from about 25 to about 65 mole percent of certain hydroxy acrylates have been disclosed in U.S. patent application Ser. No. 295,649, filed Oct. 6, 1972 and now abandoned. Still other paints which are radiation polymerizable and which comprise conventional alpha-beta olefinically unsaturated prepolymers and vinyl monomers in combination with between about 5 and about 25 weight percent based on the total formula weight of the paint of a saturated, thermoplastic vinyl resin are disclosed in U.S. patent application Ser. No. 375,992 filed July 3, 1973 and now abandoned.

While each of the discussed prior art coatings exhibits a variety of excellent properties, each suffers from certain disadvantages. Polymers bearing polymerizable unsaturation, i.e., alpha-beta olefinic unsaturation, are generally prepared by at least a two-stage synthesis which is time consuming and expensive. Polymers bearing hydroxyl functionality can be prepared by a single stage synthesis, but at the hydroxyl levels required for effective crosslinking (25 to 65 mole percent), the water- and consequently the weather-resistance of the final cured film is significantly impaired.

The radiation polymerizable coating compositions of this invention, which overcome the deficiencies of prior art coatings, on a non-polymerizable solvent, pigment, initiator and particulate filler-free basis, consist essentially of; (1) between about 90 and about 10 parts of a saturated thermoplastic vinyl polymer prepared from at least about 85 weight percent of monofunctional vinyl monomers; (2) between about 10 and about 90 parts of vinyl solvent monomers for said vinyl polymer, at least about 10 weight percent, preferably at least about 30 weight percent, of said solvent monomers being selected from the group consisting of divinyl monomers, trivinyl monomers, tetravinyl monomers and mixtures thereof; and (3) between about 1.0 and about 15.0 parts per 100 parts of the total of said thermoplastic vinyl polymer and said vinyl solvent monomers of a triester of phosphoric acid bearing one or more sites of vinyl unsaturation and having the formula:

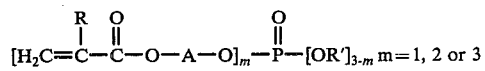

where:
R = H, Cl or $CH_3$
A = $C_nH_{2n}$, $2 - n \leq 6$
R' = $C_1$ to $C_4$ alkyl or $C_1$ to $C_4$ chloroalkyl or bromoalkyl

A. Saturated, Thermoplastic, Vinyl Resin Polymer

The saturated, thermoplastic, vinyl resin polymers useful in the paint compositions of this invention may be prepared from a single vinyl monomer or from mixtures of vinyl monomers by conventional polymerization techniques, e.g., suspension, emulsion, bulk or solution polymerization using conventional free radical initiators such as peroxides and hydroperoxides as well as azobis (isobutyronitrile). The term "vinyl monomer" as used herein refers to a monomeric compound having a

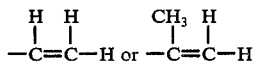

terminal group and excludes allylic compounds. Preferred monomers for preparation of the vinyl homopolymer or copolymer resins are monofunctional monoacrylates and monomethacrylates as well as monovinyl hydrocarbons. The most preferred monomers are esters of acrylic or methyacrylic and $C_1$-$C_8$ monohydric alcohols, e.g., methyl methacrylate, butyl methacrylate, butyl acrylate, 2-ethylhexyl acrylate, cyclohexyl acrylate and mixtures thereof. Monovinyl hydrocarbons suitable for use in forming polymers are styrene and substituted styrenes, such as alpha-methyl styrene, vinyl toluene, t-butyl styrene, chlorostyrene and mixtures thereof.

As indicated above, the saturated thermoplastic vinyl resin polymers or copolymers useful in paints of this invention should be formed from at least 85 weight percent of monofunctional vinyl monomers. However, difunctional monovinyl monomers such as acrylic and methacrylic acids, acrylamide, methacrylamide, 2-hydroxyethyl methacrylate, methacryloyloxyethyl phosphate and 2-acrylamido-2-metyl-propanesulfonic acid, may be used as a minor component of the polymer, i.e., up to a combined total of about 15 weight percent. The incorporation of such monomers may be desirable in some cases to provide a measure of polarity to the coating resin. However, it should be recognized that a concomitant effect of increased polarity is increased water senstivity and decreased exterior durability (weather resistance). Thus, it is preferred not to employ such polar monomers in the preparation of the paints of this invention unless necessary for the particular application.

The essentially linear, gel-free thermoplastic polymers formed from the preferred monomers set forth above should have number average molecular weights ($\overline{M}_n$) of less than about 250,000 but not less than about 2,000. Preferred values lie between about 3,000 and about 100,000 with most preferred values being between about 5,000 and about 50,000.

While the paint composition of the invention may include mixtures of polymers or copolymers formed from vinyl monomers as discussed above, it is preferred that the paint solution contain little or no alpha-beta olefinically unsaturated resins as conventionally employed in radiation-curable paint resins discussed above. The term "alpha-beta olefinically unsaturated resin" as used in this context is intended to mean an organic resin having olefinic unsaturation provided by an alpha-beta olefinically unsaturated monomer. More specifically the term is intended to mean olefinic unsaturation between the two terminal carbons of a polymer side chain. Even though the properties of the paint, particularly adhesion properties, will be affected by its inclusion, up to 5 weight percent based on the total of polymer and solvent monomer of such alpha-beta olefinically unsaturated resins may be tolerated.

B. Vinyl Solvent Monomers

At least about 10 weight percent and preferably at least about 30 weight percent of the vinyl solution monomers of the paint compositions of this invention are selected from the group consisting of divinyl monomers, trivinyl monomers, tetravinyl monomers and mixtures thereof. These di-, tri-, and tetravinyl compounds are preferably acrylates, methacrylates or vinyl hydrocarbons. The most preferred are esters of acrylic of methacrylic acids and polyhydric $C_2$-$C_8$ alcohols, e.g., neopentylglycol dimethacrylate, 1,6-hexanediol diacrylate, 1,3-butylene dimethacrylate, tri-methylolpropane triacrylate, pentaerythritol triacrylate, pentaerythritol tetraacrylate, etc. Other divinyl monomers which may be employed are disclosed in U.S. Pat. Nos. 3,586,528; 3,586,529; 3,586,530; 3,586,531; and 3,595,687. These divinyl compounds are formed by reacting either a monoepoxide or diepoxide with acrylic acid or methacrylic acid and subsequently reacting the resultant ester condensation product with a saturated acyl halide. Further tetravinyl compounds which may be employed are disclosed in U.S. Pat Nos. 3,586,526; 3,586,527 and 3,591,626. These tetravinyl compounds are formed by reacting a diepoxide with acrylic acid and/or methacrylic acid and then subsequently reacting the resultnt estr condensation product with a vinyl unsaturated acyl halide.

The remainder of the vinyl solvent monomers used in combination with the saturated, thermoplastic vinyl resin polymers or copolymers discussed above may be monofunctional, monovinyl monomers such as those used in the preparation of the polymer or copolymer.

C. Triesters of Phosphoric Acid

The coating compositions of the invention include between about 1.0 and about 15.0 parts, preferably between about 3.0 and about 10.0 parts, per 100 part of the total of said saturated, thermoplastic, vinyl resin polymer and said vinyl solvent monomers of a triester of phosphoric acid bearing one or more sites of vinyl unsaturation and having the formula:

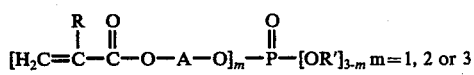

where:
R = H, Cl or $CH_3$
A = $C_nH_{2m}$, $2 \leq n \leq 6$
R' = $C_1$ to $C_4$ alkyl or $C_1$ to $C_4$ chloro- or bromo- alkyl Representative of the various species of organophosphate esters falling within the above formula are: (1) tris(methacryloyloxyethyl) phosphate (R=$CH_3$; A= —$C_2H_4$—; m = 3); (2) tris(acryloyloxyethyl) phosphate (R = H; A = —$C_2H_4$—; m = 3); (3) dimethyl methacryloyloxyethyl phosphate (R = $CH_3$; A =—$C_2H_4$—; R' = $CH_3$; m = 1); (4) diethyl methacryloyloxyethyl phosphate (R = $CH_3$; A = —$C_2H_4$—; R' = $C_2H_5$—; m = 1); (5) dipropyl acryloyloxyethyl phosphate (R = H; A = —$C_2H_4$—; R' = $C_3H_7$—; m = 1); (6) methylbis (acryloyloxyethyl) phosphate R = H; A = —$C_2H_4$—; m = 2; R' = $CH_3$); (7) ethylbis (acryloyloxyethyl) phosphate (R = H; A = —$C_2H_4$—; m = 2; R' = $C_2H_5$—);(8) methylbis (methacryloyloxyethyl) phosphate (R= $CH_3$; A = —$C_2H_4$—; m = 2; R' = $CH_3$); (9) ethylbis (methacryloyloxyethyl) phosphate (R = $CH_3$; A =—$C_2H_4$—; m = 2; R' = $C_2H_5$—); etc.

D. Photoinitiators

When the paint compositions of this invention are polymerized by exposure to ultraviolet radiation it may be desirable to include a photoinitiator or photosensitizer in the paint. The use of such photoinitiators and examples of various ones which may be employed will be discussed hereinafter in greater detail.

E. Inert Solvents and Other Additives

Inert solvents, i.e., solvents that do not enter into the polymerization or crosslinking reactions of the paint binder polymer/monomer system under normal exposure to radiation can be added to the coating formulation to reduce viscosity and aid in control of application properties. Such solvents are normally selected to be substantially more volatile than the monomeric constituents of the paint formulation, thus allowing them to evaporate prior to irradiation of the coatings. Suitable solvents include, by way of example and not by way of limitation: toluene; butyl acetate; methylethyl ketone; isopropanol; benzene; tetrahydrofuran; dioxane, methylisobutyl ketone; methylene chloride; chloroform; ethylene chloride; trichloroethylene; trichloroethane; and mixtures thereof. Additional materials such as catalysts, pigments, plasticizers, etc., all of which are well known in the formulation of coating compositions and, in particular in the art of radiation polymerizable coating compositions, may be included in the coating compositions of the invention.

II. Coated Articles and Processes for Making Same

The radiation polymerizable paints discussed above display unusually good adhesion to a variety of substrates including wood, paper, glass, shaped polymeric surfaces and metal, particularly vapor deposited metal surfaces. In addition to these outstanding adhesion properties, the coatings of the invention also exhibit excellent water resistance and intercoat adhesion. The novel paint compositions of the invention, like prior art radiation polymerizable paints discussed above, may be applied to a variety of substrates by conventional means, e.g., brushing spraying, roller coating, flow coating, etc., to an average thickness which is preferably in the range of from about 0.1 to about 4.0 mils depending on the substrate and the intended end use of the coated product.

The novel paint compositions of the invention may be cured or polymerized by exposure to radiation, preferably ionizing radiation or ultraviolet light. In either case, the paint compositions may be cured at relatively low temperatures, e.g., between room temperature (20° to 25° C) and the temperature at which significant vaporization of its most volatile component is initiated, (ordinarily between about 20° C and about 70° C).

The term "ionizing radiation" as employed herein means radiation having sufficient energy to remove an electron from a gas atom, forming an ion pair, and hence radiation with energy of, or equivalent to, about 5,000 electron volts. The preferred method of curing paint films of this invention by exposure to ionizing radiation is by subjecting such films to a beam of polymerization-effecting electrons which is at its source of emission with the range of, or equivalent to, 150,000 to 450,000 electron volts. In this method of curing, it is preferred to employ a minimum of 25,000 electron volts per inch of distance between the radiation emitter and the workpiece where the intervening space is occupied by air. Adjustment is made for the resistance of the intervening gas which is preferably an oxygen-free inert gas such as nitrogen, helium, or combustion products of natural gas. It is, however, within the scope of the use of ionizing radiation to effect polymerization using either that which is conventionally termed "high energy particle radiation" or "ionizing electromagnetic radiation."

When such ionizing radiation is employed to cure the paint compositions of this invention, the radiation energy is applied at dose rates of from about 0.1 to about 100 Mrads per second upon a preferably moving workpiece with the coating receiving a total dose in the range of from about 0.1 to about 100, preferably from about 1 to about 25 Mrads. The abbreviation "Mrads" as employed herein means 1 million Rads. The term "Rads" means that dose of radiation which results in the absorption of 100 ergs of energy per gram of absorber, e.g., coating film. The electron emitting means may be a linear electron accelerator capable of producing a direct current potentially in the range hereinbefore set forth. In such a device, electrons are ordinarily emitted from a hot filament and accelerated through a uniform voltage gradient. The electron beam, which may be about ⅛ inch in diameter at this point is scanned in one direction to make a fan-shaped beam and then passed through a metal window, e.g., a magnesium-thorium alloy of about 0.003 inch thickness.

As mentioned above, the radiation polymerizable coating compositions of this invention may also be cured by exposure to ultraviolet light. Preferably, paint compositions according to this invention which are cured by exposure to ultraviolet light contain little or no pigment. Upon exposure to light of wave lengths less than about 390 m$\mu$., most of the vinyl monomers employed in the paint compositions of this invention will fragment and produce radicals which can initiate polymerization. However, in order to make more efficient use of the output of high intensity UV sources and thereby attain a commercially feasible rate of cure, it is preferred to include a photoinitiator or photosensitizer in compositions to be cured by ultraviolet radiation.

Photoinitators (or sensitizers) are substances, generally organic compounds which, upon exposure to light of appropriate wave length, give rise to or promote the production of polymerization initiating species. It is preferred to employ a photoinitiator which decomposes to yield, or otherwise results in the production of, one or more free radical species upon exposure to light having a wavelength of less than about 380 m$\mu$. In order for any photochemical reaction to occur, there must be some overlap between the wave length of light incident upon the reaction medium (the coating) and the wave length absorbed by the photoinitiating species. Thus, the selection of an appropriate photoinitiator depends not only upon its efficacy as a polymerization initiator, but also upon the light source(s) used.

Many different types of free-radical initiators and sensitizers have been studied in acrylic systems and these are well known in the art. The rate of cure of the paint compositions of this invention, is, of course, a function of the type of initiator and its concentration, the intensity of incident light of appropriate wavelength and the type and concentration of polymerization inhibitors. Also, the detailed compositions of the coating formulation can have a significant effect on the rate of cure, especially at low exposure levels. Thus, in the end analysis, the amount of ultraviolet radiation which is necessary to achieve the desired properties in the final film formed from the paint compositions of this invention will vary with the composition of the paint itself and one or ordinary skill in this art will be able to determine the optimal exposure to UV light in view of the various factors discussed above with a minimum of experimentation.

Included among the many suitable photoinitiators are: organic carbonyl compounds such as acetone, benzophenone, benzanthrone, benzoin, benzoin methyl ethr, 2,2-diethoxyacetophenone, 2,2-dimethoxy-2-phenylacetophenone, benzoin n-butyl ether and benzoin iso-butyl ether; peroxides such as hydrogen peroxide, di-t-butyl peroxide, ergosterol peroxide and benzoyl peroxide; organic sulphur compounds such as diphenyl disulfides, dibenzoyl disulfides and dibenzothiazol disulfides; and azo compounds such as 2,2' azobis-(2-methylpropionitrile), $\alpha, \alpha$ '-azobisisobutyronitrile, azomethane, azothane, $\alpha$-azobis-1-cyclohexane carbonitrile; and other well known initiators such as 2-ethylhexyl-2-cycano-3,3-diphenylacrylate. Based on availability, solubility in the coating compositions of this invention, freedom from color and efficiency of curing at minimal UV exposure levels, the preferred photoinitiators are 2,2-diethoxyacetophenone, benzophenone and 2-ethylhexyl-2-cyano -3,3-diphenylacrylate. The amount of each photoinitiator necessary to suitability initiate polymerization in the paint compositions of this invention when curing by exposure to UV light will be apparent to those skilled in the art. It has been found, however, that generally the presence of a photoinitiator in the amount of from about 0.5 to about 5.0 parts per 100 parts of the total reactive vehicle solids in the paint composition will produce adequate curing upon exposure to a low pressure ultraviolet lamp.

A. Coated Article Including Vapor Deposited Metals

As discussed above, the coating compositions of this invention are particularly suited as abrasion and corrosion resistant protective coatings for surfaces bearing vapor deposited metals. Such coated articles bearing vapor deposited metals are a particularly preferred embodiment of this invention since they are suitable for use as a substitute for plated metal surfaces used for trim or brightwork on the exterior of automobiles.

Vapor deposition of metals, and in particular vacuum metallizing, is a simple and relatively low cost process by which thin layers of metals are deposited on prepared surfaces of substrates such as metal, plastic, glass, paper and other materials. Surfaces bearing vapor deposited metals, and in particular plastic substrates bearing thin deposits of aluminum, chromium, and stainless steel have been considered as a substitute for plated metal surfaces used for trim or brightwork on the exterior of automobiles. Since vapor deposition of metals produces very attractive surfaces and is substantially less expensive than processes for metal plating, such as chrome plating, it would appear to be ideally suited for producing such trim or brightwork. However, due to severe abrasion and corrosion problems, articles produced by vapor depositing metals have not been deemed suitable for exterior automotive use. The coating compositions of this invention, when applied over the surface of such vapor deposited metals afford the protection necessary to overcome this problem.

Vapor deposition of metals is well known and the detailed procedures will be apparent to those skilled in the art. Physical vapor deposition, the process most commonly used for decoration of plastics, involves formation of the coating by physical means alone. Two of the most commonly used techniques, i.e., resistive heating and electron beam heating, involve stepwise heating in vacuum, first melting and then vaporizing the material to be deposited. Other well known techniques such as sputtering may also be employed. The choice methods depends to some extent on the material to be deposited. A review of physical vapor deposited techniques may be found in *Vapor Deposition*, C. F. Powell, J. H. Oxley and J. M. Blocker, Jr., eds., John Wiley & Sons, Inc., New York (1966), . 221 ff. Resistive heating of a tungsten filament or basket or of a refractory crucible is commonly used for vapor desposition of aluminum, the most common evaporant for deposition on plastic parts. Electron beam heating of an evaporant contained in a suitable crucible or hearth is recommended for deposition of alloys and metals which have low vapor pressures or which form alloys with conventional filaments or crucibles at normal evaporating temperatures. Chromium and iron-chrome alloys can be deposited best using electron-beam heating techniques or sputtering.

Chemical vapor deposition techniques, also discussed in Powell et al., can in principle also be used in the formation of the composite coated articles of this invention. Such techniques involve the transfer of material across temperature or concentration gradients between the substrate and the surrounding atmosphere and formation of coatings by chemical reactions at the surface of the substrate. Chemical vapor deposition techniques often involve heating of the substrate to moderately high temperatures to form the final metallic coating. Application of these techniques is thus restricted to those substrates capable of withstanding the required process conditions.

B. Preferred Plural Coated Embodiment

The preferred coated article of this invention is prepared by: applying a base coat to a substrate and curing the coating; vapor depositing a metal layer on the base coat; applying the coating composition of this invention over the metallized surface; and curing the coating with radiation.

C. Base Coat Compositions

The base coat fills minor surface imperfections of the substrate, provides a high-gloss surface to receive the metal deposit, improves adhesion of the deposit, and reduces the quantity of gas liberated from the substrate at reduced pressures. In selecting a base coat it is thus important that the composition display good intercoat adhesion, i.e., adhere well to both the substrate and the metal layer. Many base coat compositions useful in metal vapor deposition processes are known in the art and one of ordinary skill in this art will, of course, select the composition best suited for the substrate and metal being used. However, certain lacquers and radiation polymerizable base coats are preferred for the preferred plural coated embodiment of this invention.

The lacquers and the radiation polymerizable compositions preferred as base coats in the process of this invention may be applied by conventional means, e.g., spray coating, dip coating, flow coating, etc., to an average thickness which is preferably in the range of from about 0.1 to about 4.0 mils. The lacquers preferred as base coats are well-known in the prior art and may be air dried or heat cured. Most bake-curing lacquers cure in 1-3 hours at temperatures ranging from 140° to 180° F. The radiation polymerizable base coats may be cured at relatively low temperatures, e.g., between room temperature (20° to 25° C) and the temperature at which significant vaporization of its most volatile reactive component is initiated, (ordinarily between about 20° and about 70° C). The radiation energy is applied at dose rates of from about 0.1 to about 100 Mrads per second upon a preferably moving workpiece with the coating receiving a total dose in the range of from about 0.1 to about 100, preferably from about one to about 25 Mrads. It will be appreciated that the use of radiation polymerizable base coats will substantially lessen the processing time necessary for producing the plural coated articles of the invention. In addition, radiation polymerizable base coats lessen the severity of stress cracking with some metals.

The lacquer base coats which are preferred are well-known in the art of vapor deposition, and in particular vacuum metallizing, and consist essentially of a thermoplastic or thermosetting resin in a volatile solvent. Representative of the organic resins which may be employed individually or in combination to formulate such a lacquer are: acrylic resins, alkyd resins (pure and modified), polyesters, conventional varnishes, urea-formaldehyde resins, vinyl polymers, acrylonitrile polymers, phenolic resins, cellulosic resins, polyurethanes, butyl rubber and chlorinated butyl rubber, silicone resins, melamine-formaldehyde resins, polystyrenes, natural rubber, and modified phenolic resins. Numerous base coats employing such organic resins are commercially available.

Radiation polymerizable base coat compositions which are preferred for use in the process and articles of this invention include the composition employed as the radiation polymerizable top coat, i.e., the coating composition of this invention described above in detail. Also, the preferred base coat may be the composition disclosed and claimed in U.S. patent application Ser. No. 500,828 filed Aug. 26, 1974 and entitled "Protective Coating Composition, Plural Coated Article and Process for Making Same-A" now abandoned. That composition corresponds to the composition of this invention with the exception that it does not include the triester of phosphoric acid. A further preferred base coat for the preferred plural coated articles of this invention is the topcoat disclosed in U.S. patent application Ser. No. 500,832 filed Aug. 26, 1974, entitled "Protective Coating Composition, Plural Coated Article and Process for Making Same-B", now U.S. Pat. No. 3,987,127. The composition disclosed in that application is the same as the top coat of this invention with the exception that the triester of phosphoric acid is replaced by a mono or diester in amounts ranging from about 0.05 to about 1.0, preferably about 0.1 to about .6, parts per 100 parts of the total of the thermoplastic vinyl polymer and the vinyl solvent monomers. This additive has the formula:

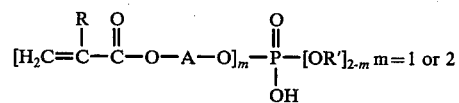

where:
R = H, Cl or CH$_3$
A = C$_n$H$_{2n}$, 2 $\leq$ n $\leq$ 6
R' = H, C$_1$ to C$_4$ alkyl; C$_1$ to C$_4$ bromo- or chloroalkyl;

Representative of the various species of organophosphate ester falling within the above formula are: (1) 2-methacryloyloxyethyl phosphate (R=CH$_3$; A=λ—C$_2$H$_4$—; R'=H; m=1); (2) di-(2-methacryloyloxyethyl) phosphate (R=CH$_3$; A=—C$_2$H$_4$—; m=2); (3) 2-acryloyloxyethyl phosphate (R=H; A=—C$_2$H$_4$—; R'=H; m=1); (4) di(2-acryloyloxyethyl) phosphate (R=H; A=—C$_2$H$_4$—; m=2); (5) methyl-2-methacryloyloxyethyl phosphate (R=CH$_3$; A=—C$_2$H$_4$—; R'=CH$_3$; m=1); (6) ethylmethacryloyloxyethyl phosphate (R=CH$_3$; A=—C$_2$H$_4$—; R'=C$_2$H$_5$—; m=1); (7) methylacrylolyloxyethyl phosphate (R=H; A=λ—C$_2$H$_4$—; R'=CH$_3$; m=1); and (8) ethylacryloyloxyethyl phosphate (R=H; A =—C$_2$H$_4$—; R'=C$_2$H$_5$; m=1).

Still further, the preferred radiation polymerizable base coat may comprise a film-forming solution which, exclusive of non-polymerizable solvents, pigments and other non-reactive components consists essentially of: (1) between about 90 and about 10 parts, preferably between about 70 and about 30 parts, of an alpha-beta olefinically unsaturated urethane modified organic resin; and (2) between about 10 and about 90, preferably between about 30 and about 70, parts of vinyl solvent monomers, i.e., vinyl monomers which act as solvents for the alpha-beta olefinically unsaturated urethane-modified organic resin. Such a film-forming radiation polymerizable composition is disclosed in U.S. Pat. No. 3,437,514, the entire disclosure of which is incorporated herein by reference.

The alpha-beta olefinically unsaturated urethane-modified organic resin has a molecular weight greater than 1,000, preferably between 5,000 and 50,000 and still more preferably between 5,000 and 20,000 and contains between about 0.5 and about 5, preferably between about 0.5 and about 3, units of olefinic unsaturation per 1000 units of molecular weight. The resin is formed by reacting a diisocyanate monomer and an organic resin having in its molecular structure a plurality of hydrogen atoms which are labile with respect to the isocyanate group, e.g., a labile hydrogen atom of an amine, amide, alcohol or carboxylic acid, and subsequently reacting the product with a hydroxylated vinyl monomer. The organic resin used in the preparation may be a polyester or a resin formed by copolymerization of acrylic monomers, i.e., acrylic and methacrylic acids as well as esters formed therefrom. Exemplary of the many diisocyanates which may be employed to form the alpha-beta olefinically unsaturated resins are: 2,4 tolylene diisocyanate, 65/35 tolylene diisocyanate, 80/20 tolylene diisocyanate, 4,4' diphenylmethane diisocyanate, dianisidine diisocyanate, tolidene diisocyanate, hexamethylene diisocyanate, etc.

The formulation of various polyesters, such as hydroxy terminated polyesters, and polymers or copolymers formed from acrylic monomers and bearing functional groups which will react with the diisocyanate compounds are well-known in the art. Exemplary of the many monomers which may be employed in the vinyl monomers compound constituent of the urethane-modified base coat are: esters of $C_1$–$C_8$ monohydric alcohols and acrylic or methacrylic acids, e.g., methyl methacrylate, ethyl acrylate, butyl acrylate, butyl methacrylate, octyl acrylate, 2-ethylhexyl acrylate, etc.; esters of alcohols of higher carbon numbers, e.g., $C_9$–$C_{15}$ as well as difunctional alcohols and acrylic or methacrylic acids; vinyl hydrocarbon monomers, e.g., styrene and alkylated styrenes such as vinyl toluene, alpha-methylstyrene, etc.,; divinyl and tetravinyl compounds; and small amounts of other vinyl monomers such as acrylonitrile, acrylamide or vinyl acetate.

The urethane-modified organic resin base coats may also include additives such as pigments, catalysts, inert solvents, etc., as discussed above with respect to top coats.

It should be appreciated that various coating formulations are within the scope of this invention and that such compositions may be applied to various substrates in the manner described. Therefore, it should be understood that the following specific examples are presented by way of illustration and not by way of limitation.

EXAMPLE 1

A radiation polymerizable coating is prepared from the following materials in the manner hereinafter set forth;

| Step 1. Preparation of Paint Binder Resin | |
|---|---|
| | Parts by Weight |
| (1) Water | 150 |
| (2) Triton X200* | 5.2 |
| (3) 1% aquous $K_2S_2O_8$ | 30 |
| (4) Methyl methacrylate | 300 |
| (5) Water | 270 |

| Step 1. Preparation of Paint Binder Resin (continued) | |
|---|---|
| | Parts by Weight |
| (6) Triton X200* | 3.5 |
| (7) Triton X305** | 10.7 |
| (8) $K_2S_2O_8$ | 1.2 |
| (9) Octanethiol | 2.1 |

*Triton X200, a product of Rohm & Haas Co., is an anionic surfactant containing 28% active component (the sodium salt of an alkyl aryl polyester sulfonate).
**Triton X305, a product of Rohm & Haas Co., is a nonionic surfactant containing 70% active component (an alkylarylpolyether alcohol averaging 30 ethylen oxide units).

Items 1 and 2 are charged to a reactor provided with a condenser, a thermometer, an agitator, and a dropping funnel. The mixture is boiled to remove dissolved oxygen, and cooled slightly to 90° C. Item 3 is added. A mixture of the remaining ingredients is then added slowly over a period of about 40 minutes while maintaining the reaction mixture at reflux. Following the monomer addition, the mixture is maintained at reflux for an additional 2 hours.

The latex so obtained is cooled and coagulated by adding it dropwise to three volumes of rapidly stirred methanol heated to about 40° C. The polymeric precipitant is isolated by filtration, washed with methanol, dried in vacuo and used in the subsequent preparation of coating materials. The polymer molecular weight is about 10,000.

| Step 2. Formulation of Coating | |
|---|---|
| | Parts by Weight |
| (1) Polymer from Step 1 | 24.2 |
| (2) Neopentylgylcol diacrylate | 36.4 |
| (3) 2-ethylhexyl acrylate | 39.4 |
| (4) Tris (methacryloyloxethyl) phosphate | 4.0 |
| (5) Butyl Acetate | 40 |
| (6) Toluene | 40 |
| (7) Methyl ethyl ketone | 10 |
| (8) Isopropanol | 10 |

A solution of polymer is prepared using the above listed monomers and solvents. The film-forming solution so obtained is applied to a plastic substrate bearing a vacuum deposited aluminum surface and cured thereon under an inert atmosphere by electron beam irradiation using a total dosage of 9 Mrads (voltage 275 KV, current 40 ma.).

The coating so obtained displays no softening or color change, and the underlying metal is similarly unaffected by 240 hours exposure to water at 90° F. No failure is observed in 168 hours 5% salt spray exposure. By way of comparison, a similarly prepared coating from which the phosphate additive is omitted, when subjected to similar test conditions, is observed to allow attack on and virtually complete removal of the underlying metal adjacent to a scribed line.

EXAMPLE II

A coating composition is prepared in accordance with the procedures of Example I with the exception that: (1) one part of octanethiol is used in the preparation of the polymer which has a molecular weight ($\overline{M}_n$) of about 17,000; (2) 5 parts of diethylmethacryloyloxyethyl phosphate are employed as the organophosphate ester component; and (3) 3 parts per 100 parts of reactive solids in the coating composition of 2,2 diethoxyacetophenone are added. This coating composition is applied to a substrate comprising a surface of vapor deposited aluminum and cured by exposure to UV light.

The coating exhibits excellent abrasion and water resistance.

EXAMPLE III

The procedures of Example I are repeated with the exception that: (1) 4.5 parts of octanethiol are used in the preparation of the polymer which has a molecular weight ($\overline{M}_n$) of about 5,000; and (2) 1.0 parts of tris (acryloyloxyethyl) phosphate are employed as the organophosphate ester component. The coating compositions, when applied to and cured in situ on a plastic substrate bearing a vapor deposited antimony surface, forms an abrasion and corrosion resistant surface.

EXAMPLE IV

The procedures of Example I are repeated with the difference that: (1) the polymer is formed from an equimolar mixture of isobutyl methacrylate and methyl methacrylate; (2) the inert solvent portion is comprised of equal parts by weight butyl acetate and toluene; and (3) 7.0 parts of dimethyl methacryloyloxyethyl phosphate are employed as the organophospate ester component. The coating composition is sprayed onto two (2) substrates, one having a surface comprising a vapor deposited alloy of iron and chrome(80% Fe/20% Cr) and the other being a steel panel, and cured by electron beam irradiation. The cured coating adheres well to both surfaces, and is both abrasion and water resistant.

EXAMPLE V

The procedures of Example I are repeated with the exception that: (1) the polymer is formed from an equimolar mixture of ethyl acrylate, styrene, methyl methacrylate and isobutyl methacrylate; and (2) 9.0 parts of dipropylacryloyloxyethyl phosphate are employed as the organophosphate ester component. The solution is applied to a glass substrate bearing a thin film of vacuum deposited aluminum and cured by electron beam irradiation as in Example I. The surface of the resultant coated article is both abrasion and corrosion resistant.

EXAMPLE VI

The procedures of Example II are repeated with the exception that: (1) the solution monomers are 1,6 hexanedioldiacrylate and 2-ethylhexyl acrylate, present in equal proportions by weight; and (2) 9.5 of ethyl bis acryloyloxyethyl phosphate are employed as the organophosphate component. The coating composition is applied to metal, glass, wood and plastic substrates and cured by exposure to UV radiation. The cured coatings are durable and exhibit good adhesion and water resistance.

EXAMPLE VII

A radiation polymerizable coating is prepared from the following materials in the manner hereinafter set forth:

| Step 1. Preparation of Polymer | |
|---|---|
| | Parts by Weight |
| (1) Methyl methacylate | 290 |
| (2) Methacrylic acid | 10 |
| (3) t-butylperoctoate | 1.5 |
| (4) Toluene | 300 |
| (5) 10% t-butylperoctoate in toluene | 10 |

A mixture of items 1 and 2 is added dropwise over a 2-hour period to a reaction flask (equipped with a condenser, thermometer, agitator, and dropping funnel) containing item 3 maintained at reflux. The mixture is refluxed 2 to 3 additional hours; item 4 is charged to the flask at the end of the first hour. The polymer so obtained has a number average molecular weight of about 13,000.

| Step 2. Formulation of Coating | |
|---|---|
| | Parts by Weight |
| (1) Polymer from Step 1 | 27 |
| (2) Neopentylglycol diacylate | 35 |
| (3) 2-ethylhexyl acrylate | 38 |
| (4) Tris (methacryloyloxyethyl) phosphate | 5.0 |

The polymer solution from Step 1 is mixed with monomers to give the ratios of polymer to monomer indicated above. The resulting solution is reduced to spray viscosity (about 15 seconds, Ford cup No. 4) using a mixture of butyl acetate, toluene, ethyl acetate and isopropanol is proportion by weight 4:4:1:1.

The film forming composition so obtained is applied to a plastic substrate bearing vapor deposited aluminum and cured according to the procedures of Example I. The coating is essentially unaffected by 240 hours exposure to water at 90° F. No failure is observed in 240 hours 5% salt spray.

EXAMPLE VIII

The procedures of Example VII are repeated with the difference that the coating formulation comprises: 70 parts by weight polymer; 30 parts by weight neopentylglycol diacrylate; and 2 parts by weight 2,2diethoxyacetophenone. This formulation is reduced to spray viscosity (about 15 seconds Ford cup No. 4) using a 1:1 mixture of toluene and butylacetate.

The film forming composition so obtained is applied to a plastic substrate coated with vacuum deposited aluminum and cured thereon by exposure for 3 minutes in a nitrogen atmosphere to radiation from a low pressure mercury lamp (intensity about $4 \times 10^{16}$ photons sec$^{-1}$ cm$^{-2}$, major UV peak at 2537 angstroms) at a distance of 1 inch. The cured coating displays adhesion and solvent and water resistance essentially equivalent to those of a comparable electron beam cured coating.

EXAMPLE IX

The procedure of Example VIII is repeated with the sole difference that the photoinitiator used is 2-ethylhexyl-2 cyano-3,3 diphenylacrylate. Essentially equivalent results are obtained.

EXAMPLE X

Commercially available materials may be used for the polymer. Film forming solutions are prepared from Acryloid A21LV and Acryloid B48N as set forth hereinafter. Acryloid A21LV is marketed by Rohm & Haas Co. and is described as a methyl methacrylate polymer having Tg=105° C; it is supplied as a 30% by weight solution in a mixture of toluene, methyl ethyl ketone, and butanol (in proportion by weight 50:40:10) at a Brookfield viscosity of 210–280 cps at 20° C. The number average molecular weight is about 13,000. Acryloid B48N is marketed by Rohm & Haas Co. and is described as a methyl methacrylate copolymer having Tg=50° C; it is supplied as a 45% by weight solution in toluene at Brookfield viscosity of 6,000 to 10,000 at 25° C. The number average molecular weight is about 15,000.

Coating compositions A, B, C, D and E are prepared as follows:

|  | Parts by Weight | | | | |
| --- | --- | --- | --- | --- | --- |
|  | A | B | C | D | E |
| Acryloid B48N (solids basis) | 35 | 0 | 0 | 15 | 0 |
| Acryloid A21LV (solids basis) | 0 | 23 | 23 | 0 | 65 |
| 2-ethylhexyl acrylate | 30 | 40 | 40 | 35 | 5 |
| Neopentylglycol diacrylate | 35 | 37 | 0 | 0 | 0 |
| 1,6-hexanediol diacrylate | 0 | 0 | 37 | 0 | 30 |
| Trimethylolpropane triacrylate | 0 | 0 | 0 | 50 | 0 |
| Ethylbis (methacryloyloxyethyl) phosphate | 5 | 8.0 | 7.0 | 4.0 | 3.0 |

As were reduced to spray viscosity using an inert solvent mixture of toluene, methyl ethyl ketone, butyl acetate and isopropanol. The solutions are then sprayed on substrates bearing vacuum deposited aluminum surfaces and cured thereon using an electron beam to give a total radiation dose of 9 Mrads (voltage 275 KV., current 40 ma). All the cured coatings so obtained displayed excellent adhesion to the substrates and good solvent and water resistance. Coatings formed from compositions A, C and E also display excellent corrosion protection when immersed in a 5% aqueous solution of sodium chloride for a period of 30 days. The coatings formed from compositions B and D, on the other hand, exhibited poor water resistance. The films formed from D became hazy under the above test conditions as well as under 240 hours immersion in water at 90° F.

EXAMPLE XI

The coatings of Example X are compared with a coating from which thermoplastic polymer is omitted. A mixture of 50 parts by weight 2-ethylhexyl acrylate and 50 parts by weight 1,6-hexanediol diacrylate was prepared, applied to a substrate and cured under the conditions specified in Example VIII. The coating obtained displayed very poor adhesion, especially to polymeric substrates.

EXAMPLE XII

A plural coated article including a vacuum deposited metal layer is prepared as follows.

A. Preparation and Application of Base Coat

|  |  | Parts by Weight |
| --- | --- | --- |
| (1) | Acryloid B82 | 50 |
| (2) | Pentaerythritol triacrylate | 100 |

Components (1) and (2) are mixed in the indicated proportions by weight, reduced to spray viscosity (13 sec. Ford Cup No. 4) using an inert solvent mixture of toluene, methyl ethyl ketone, butyl acetate and isopropanol, applied to an injection molded ABS (acrylonitrile-butadiene-styrene copolymer) plastic substrate, and cured thereon by exposure to an electron beam in an inert atmosphere at 280 KV, 40 ma for a total dose of 8 Mrads.

B. Applicatiion of the Metal Layer

A layer of type 430 stainless steel is deposited on the base coated substrate by a conventional vacuum deposition technique employing electron beam heating of the evaporant.

C. Preparation and Application of Top Coat

|  |  | Parts by Weight |
| --- | --- | --- |
| (1) | Acryloid A21LV | 40 |
| (2) | Neopentylglycol diacrylate | 30 |
| (3) | 2-ethyl hexyl acrylate | 30 |
| (4) | Tris (methacryloyloxyethyl) phosphate | 4.0 |

The listed components are mixed in the indicated proportions by weight, reduced to spray viscosity with an inert solvent mixture of toluene and methyl ethyl ketone, applied to the metallized substrate, and cured by exposure to an electron beam at 280 KV and 40 ma for a total dose of 8 Mrad.

EXAMPLE XIII

An electron polymerizable coating is formulated in the manner set forth in Example VII using the following materials:

|  |  | Parts by Weight |
| --- | --- | --- |
| (1) | Polymer from Step 1, Example VII | 30 |
| (2) | Pentaerythritol tetraacrylate | 20 |
| (3) | 2-ethylhexyl acrylate | 50 |
| (4) | diethyl methacryloyloxyethyl phosphate | 3.0 |

The coating composition is sprayed on a glass substrate bearing a coating of vacuum deposited aluminum and cured by an electron beam. The resultant film exhibits outstanding solvent and corrosion resistance.

EXAMPLE XIV

Commercially available resins of high molecular weight may be used in the preparation of low solids content coatings. Film forming solutions are prepared from Elvacite 2009 and Elvacite 2041 as set forth hereinafter. Elvacite 2009 and Elvacite 2041 are marketed by E. I. Du Pont de Nemours & Co., Inc. Electrochemicals Department and are described as methyl methacrylate polymers of medium and very high molecular weight, respectively. The number average molecular weights of the resins used for the present work is 57,000 (Elvacite 2009) and 240,000 (Elvacite 2041); the corresponding weight average molecular weights are 106,000 and 540,000.

|  | Parts by Weight | |
| --- | --- | --- |
|  | A | B |
| Elvacite 2009 | 21.5 | — |
| Elvacite 2041 | — | 23 |
| 2-ethylhexyl acrylate | 44 | 46 |
| Neopentylglycol acrylate | 34 | 31 |
| Tris (methacryloyloxyethyl) phosphate | 5.0 | 5.0 |

Formulation A is reduced to spray viscosity using a 40/40/20 mixture of methylethylketone, toluene, and ethyl acetate, while formulation B is reduced to spray viscosity with a 50/50 mixture of toluene and methylethyl ketone. The coating formulations obtained are sprayed upon plastic substrates previously decorated by vacuum deposition of aluminum, and are cured thereon. The composite coatings so obtained display exceptional mar resistance and corrosion resistance.

EXAMPLE XV

A plural coated article including a vacuum deposited metal layer is prepared as follows.

A. Preparation and Application of Base Coat

| Step 1. Preparation of Polymeric Intermediate | | |
|---|---|---|
| | Mole Percent | Mole Percent |
| (1) Adipic Acid | 24 | 28 |
| (2) Maleic Anhydride | 8 | 5.6 |
| (3) Neopentyl glycol | 38 | 31.1 |
| (4) Hexamethylene diisocyanate | 16 | 22.1 |
| (5) 2-hydroxyethylacrylate | 14 | 13.2 |

Components (1), (2) and (3) are charged to a reaction vessel equipped in the usual manner for polyester synthesis (i.e., so that water can be removed during the course of the reaction) and heated gradually to 230° C. When an acid value of less than 16 is obtained (average reactant time 16 hours), the mixture is cooled to 150° C and 0.04 weight percent hydroquinone is added. The mixture is further cooled to below 100° C and reduced to 70% solids with butyl acrylate.

Component (4) is added at room temperature and the mixture is heated at 60°–70° C until an isocyanate level of 5% is obtained.

Component (5) is added at 70° C and the mixture heated at 80°–100° C until the isocyanate is completely reacted. The mixture is reduced to 60% solids with equal parts of 2-hydroxyethylacrylate and butylacrylate.

| Step 2. Preparation of Coating Formulation | |
|---|---|
| | Parts by Weight |
| (1) Resin solution from I | 60 |
| (2) 2-hydroxyethylacrylate | 10 |
| (3) Hydroxyethylacrylate | 20 |
| (4) Methylmethacrylate | 40 |

The listed components are mixed in indicated proportions by weight, sprayed on a plastic substrate and cured with an electron beam in a nitrogen atmosphere at 280 KV, 40 ma for a total dose of 10 Mrads.

B. Application of Metal Layer

A layer of type 430 stainless steel is deposited on the base coat by a conventional vacuum deposition technique employing electon beam heating of the evaporant.

C. Preparation and Application of Top Coat

Step 1. Preparation of Resin

An electron polymerizable coating is prepared from the following materials in the manner hereinafter set forth:

| | Parts by Weight |
|---|---|
| (1) Methyl Methacrylate | 300 |
| (2) t-butylperoctoate | 1.5 |
| (3) Toluene | 300 |
| (4) 10% t-butylperoctoate in toluene | 10 |

A mixture of items 1 and 2 is added dropwise over a 2 hour period to a reaction flask (equipped with a condenser, thermometer, agitator, and dropping funnel) containing item 3 maintained in reflux. The mixture is refluxed 1 to 3 additional hours; item 4 is charged to the flask at the end of the first hour. The polymer so obtained has a number average molecular weight of about 14,400.

| Step 2. Preparation of Coating | | |
|---|---|---|
| | Parts by Weight | |
| | A | B |
| (1) Polymer from Step 1 | 27 | 50 |
| (2) Neopentylyglycol diacrylate | 35 | 20 |
| (3) 2-ethylhexyl acrylate | 38 | 24 |
| (4) dipropylacryloyloxyethyl phosphate | 3.0 | 3.0 |

The film forming top coat so obtained is applied by flow coating on the surface of the article bearing the vacuum deposited metal and cured by electron beam irradiation at 280 KV, 40ma for a total dose of 10 Mrads.

The resultant vapor metallized article passes cross-hatch adhesion tests, can withstand a minimum of 50 rubs with a cloth soaked in methyl ethyl ketone. Also, the plural coated article is unaffected by immersion in water at 90° F for 240 hours and 10 day immersion in a 5% aqueous sodium chloride solution.

EXAMPLE XVI

The procedures of Example XV are followed with the difference that:

1. The polymer solution of (C) Step 1 is prepared using:

| | Parts by Weight |
|---|---|
| (a) Methyl methacrylate | 200 |
| (b) t-butylperoctoate | 3 |
| (c) Toluene | 300 |
| (d) 7% t-butylperoctoate in toluene | 10 |

(The polymer obtained has a number average molecular weight of about 7,000); and 2. the coating of (C) Step 2 contains 3.0 parts of dimethyl acryloyloxyethyl phosphate. The resultant vapor metallized article passes cross-hatch adhesion tests and can withstand a minimum of 50 rubs with a cloth soaked in methyl ethyl ketone. Also, the plural coated article is unaffected by immersion in water at 90° F for 240 hours and 10 day immersion in a 5% aqueous sodium chloride solution.

EXAMPLE XVII

The procedure of Example XV is repeated except that in (B) a layer of aluminum is deposited by employing a tungsten filament to heat the evaporant; and the polymer of (C) Step 1 is prepared by using:

| | Parts by Weight |
|---|---|
| (1) Methyl methacrylate | 150 |
| (2) Butyl methacrylate | 45 |
| (3) Acrylic acid | 5 |
| (4) t-butyl peroctoate | 1 |
| (5) Toluene | 300 |
| (6) 10% t-butylperoctoate in toluol | 10 |

The polymer obtained has a number average molecular weight of about 14,000. The resultant vacuum metallized article passes cross-hatch adhesion tests, can withstand a minimum of 50 rubs with a cloth soaked in methyl ethyl ketone, is unaffected by immersion in water at 90° F for 240 hours and is unaffected by 10 days immersion in a 5% aqueous sodium chloride solution.

EXAMPLE XVIII

The procedure of Example XV is repeated with two exceptions. First the base coat composition is prepared from commercial electron beam polymerizable resins as follows:

|  | Parts by Weight | |
|---|---|---|
|  | A | B |
| (1) RD2107-30* | 40 | — |
| (2) RD2278-58* | — | 60 |
| (3) hydroxyethylacrylate | 20 | 20 |
| (4) Methyl methacrylate | 50 | 40 |

*Both of these resins are unsaturated polyurethanes manufactured by Hughson Chemical Company of Erie, Pennsylvania. (1) is supplied as a solution of 80% polymer, 20% 2-ethylhexyl acrylate; and (2) is supplied as a solution of 70% polymer, 15% methyl methacrylate, and 15% 2-ethylhexyl acrylate.

Second, 7.0 parts of diethylmethacryloyloxyethyl phosphate are employed as the organophosphate ester component. The Coated article so obtained passes cross-hatch adhesion tests and can withstand a minimum of 50 rubs with a cloth soaked in methyl ethyl ketone. The surface coating does not soften or change color, and the under lying metal is similarly unaffected by 240 hours exposure to water at 90° F. No failure is observed in 240 hours immersion in a 5% aqueous sodium chloride solution.

EXAMPLE XIX

The procedure of Example XV is followed with the exception that the vapor deposited metal is aluminum and the top coat is prepared using commercially available resins as follows:

|  | Parts by Weight | | | | |
|---|---|---|---|---|---|
|  | A | B | C | D | E |
| Acryloid B48N (solid basis) | 35 | 0 | 0 | 15 | 0 |
| Acryloid A21LV (solid basis) | 0 | 23 | 23 | 0 | 65 |
| 2-ethylhexl acrylate | 30 | 40 | 40 | 35 | 5 |
| Neopentylglycol diacrylate | 35 | 37 | 0 | 0 | 0 |
| 1,6-hexanediol diacrylate | 0 | 0 | 37 | 0 | 30 |
| Trimethylolpropane triacrylate | 0 | 0 | 0 | 50 | 0 |
| Tris (methacryloyloxyethyl) phosphate | 1.0 | 5.0 | 8.0 | 4.0 | 3.0 |

Acryloid B48N and Acryloid A21LF are commercially available materials. Acryloid A21LV is marketed by Rohm & Haas Co. and is described as a methyl methacrylate polymer having a $T_g = 105°$ C; it is supplied as a 30% by weight solution in a mixture of toluene, methyl ethyl ketone, and butanol (in proportion by weight 50:40:10) at a Brookfield viscosity of 210-280 cps. at 25° C. The number average molecular weight is about 31,000. Acryloid B48N is marketed by Rohm Haas Co. and is described as a methyl methacrylate copolymer having a $T_g = 50°$ C; it is supplied as a 45% by weight solution in toluene at a Brookfield viscosity of 6000 to 10,000 at 25° C. The number of average molecular weight is about 15,000.

All of the above coatings are reduced to spray viscosity using an inert solvent mixture of toluene, methylethyl ketone, butylacetate and ispropopanol and the spray coated on the vacuum metallized surfaces. The coating is then cured by electron beam to give a total radiation dose of 9 Mrads (voltage 275 KV, current 40ma).

The resultant coated articles pass cross-hatch adhesion tests and can withstand 50 rubs with a cloth soaked in methyl ethyl ketone. The surface coating does not soften or change color, and the underlying metal is similarly unaffected by 240 hours exposure to water at 90° F. No failure is observed in 240 hours immersion in a 5% aqueous chloride solution.

EXAMPLE XX

A plural coated article including a vacuum deposited metal layer is prepared as follows:

A. A commercially available base coat lacquer Red Spot SM 1817 sold by Red Spot Paint and Varnish Company and including a urealkyd type polymer is applied to a glass substrate and cured by heating for 90 minutes at 170° F.

B. An aluminum layer is deposited on the base coat by a conventional vacuum deposition technique.

C. A top coat formulation having the following composition is prepared:

|  | Parts by Weight |
|---|---|
| (1) Acryloid A21LV (solid basis | 32 |
| (2) 2-ethylhexyl acrylate | 38 |
| (3) Neopentylglycol diacrylate | 30 |
| (4) Diethylmethacryloyloxyethyl phosphate | 4.0 |

The coating is reduced to spray viscosity using a 40:40:10 mixture of butyl acetate, toluene, methyl ethyl ketone and isopropanol, sprayed onto the vacuum metallized substrate, and then cured by an electron beam at a total dose of 9 Mrad.

The resultant vacuum metallized article exhibits a taped cross-hatch rating for adhesion to aluminum of 9 (a rating of zero corresponding to complete catastrophic removal of a coating and 10 corresponding to no removal). The coated article also can withstand a 30 to 50 rubs with a cloth soaked in methyl ethyl ketone and is unaffected by either 240 hour immersions in water at 90° F or 10 day immersion in a 5% aqueous sodium chloride solution.

EXAMPLE XXI

The procedure of Example XX is repeated except that: (1) the lacquer base coat employed is a melamine-formaldehyde resin; and (2) the top coat formulation is:

|  | Parts by Weight |
|---|---|
| (1) Acryloid B48N (solid basis) | 30 |
| (2) 2-ethylhexyl acrylate | 37 |
| (3) Neopentylglycol diacrylate | 33 |
| (4) Diethylacryloyloxyethyl phosphate | 6.0 |

The resultant vacuum metallized article exhibits a taped cross-hatch rating for adhesion to aluminum of 8. The article can withstand 30 to 50 rubs with a cloth soaked in methyl ethyl ketone and is unaffected by either 240 hours immersion in water at 90° F or 10 day immersion in a 5% aqueous sodium chloride solution.

EXAMPLE XXII

A plural coated article including a vacuum deposited metal layer is prepared as follows:

A. a base coat having the following formulation is prepared:

|  |  | Parts by Weight |
|---|---|---|
| (1) | Elvacite 6011* (40% solids in a 30/70 mixture of acetone and toluene) | 40.0 |

|     |                              | Parts by Weight |
|-----|------------------------------|-----------------|
| (2) | Trimethylolpropane triacrylate | 24.0          |
| (3) | Hydroxypropylacrylate        | 8.0             |
| (4) | 2-ethylhexylacrylate         | 16.0            |
| (5) | Methyl ethyl ketone          | 12.0            |

*Elvacite 6011 is a methylmethacrylate polymer manufactured by Dupont. The inherent viscosity of a solution of .25 grams polymer in 50 ml chloroform measured at 25° C in a No. 50 Cannon-Fenske Viscometer is .34.

The above materials are mixed and the formulation reduced to spray viscosity (#1 Zahn Cup, 40 secs) wtih a 1:1 mixture of toluene and butyl acetate. The formulation is then sprayed on a plastic substrate and cured by exposure to electron beam irradiation as in previous examples.

B. An antimony layer is deposited on the base coat by conventional vacuum deposition technique using a tungsten folamemnt to heat the evaporant.

C. A top coat is prepared from the following materials:

|     |                                        | Parts by Weight |
|-----|----------------------------------------|-----------------|
| (1) | Acryloid A21LV (30% non solids)        | 50.0            |
| (2) | 1,6 hexane diol diacrylate             | 24.0            |
| (3) | 2-ethylhexyl acrylate                  | 26.0            |
| (4) | Methylbis (methacryloyloxyethyl) phosphate | 2.0         |

These materials are mixed, reduced to spray viscosity with 1:1 toluene and butyl acetate, sprayed on the vacuum metallized surface and cured by electron beam irradiation (9 Mrad dose).

The plural coated articles passes cross-hatch tape adhesion tests, resists in excess of 50 rubs with a cloth soaked in methyl ethyl ketone. Also, the coated article resists exposure to water at 90° F and a 5% aqueous solution of sodium chloride for 240 hours.

EXAMPLE XXIII

A plural coated article including a vacuum deposited metal layer is prepared as follows:

A. A base coat having the following formulation is prepared:

|     |                              | Parts by Weight |
|-----|------------------------------|-----------------|
| (1) | Elvacite 6012*               | 40.0            |
| (2) | Trimethylolpropane triacrylate | 24.0          |
| (3) | Hydroxypropylacrylate        | 8.0             |
| (4) | 2-ethylhexylacrylate         | 16.0            |
| (5) | methyl ethyl ketone          | 12.0            |

*Elvacite 6012 is a methylmethacrylate polymer manufactured by Dupont. The inherent viscosity of a solution of .25 grams polymer in 50 ml chloroform measured at 20° C in a No. 50 Cannon-Fenske Viscometer is .38.

|     |                                | Parts by Weight |
|-----|--------------------------------|-----------------|
| (3) | Toluene                        | 300             |
| (4) | 10% t-butylperoctoate in toluene | 10            |

A mixture of items 1 and 2 is added wise over a two hour period to a reaction flask (equipped with a condenser, thermometer, agitator and dropping funnel) containing item 3 maintained at reflux. The mixture is refluxed 2 to 3 additional hours; item 4 is charged to the flask at the end of the first hour. The polymer so obtained has a number average molecular weight of about 13,000.

2. 50 parts by weight of the polymer prepared in (1) is combined with 24.0 parts of hexanediol diacrylate, 26.0 parts of 2-ethyl hexyl acrylate; and 0.2 parts of ethylbis (methacryloyloxyethyl) phosphate.

These materials are mixed, reduced to spray viscosity with 1:1 toluene and butyl acetate, sprayed on the vacuum metallized surface and cured by electron beam irradiation as in previous examples.

The plural coated article passes cross-hatch tape adhesion tests, and resists in excess 50 rubs with a cloth soaked in methyl ethyl ketone. The article is also not adversely affected by exposure to water at 90° F and a 5% aqueous solution of sodium chloride for 240 hours.

EXAMPLE XXIV

A plural coated article including a vacuum deposited metal layer is prepared as follows:

A. A base coat having the following formulation is prepared:

|     |                              | Parts by Weight |
|-----|------------------------------|-----------------|
| (1) | Acryloid B-44 (40%)*         | 38.5            |
| (2) | Trimethylolpropanetriacrylate | 38.5           |
| (3) | Hydroxypropylacrylate        | 7.7             |
| (4) | 2 ethyl hexyl acrylate       | 15.3            |

*Acryloid B-44 is a methyl methacrylate copolymer having a T$_g$ or 60° C and has a Brookfield viscosity at 25° C of 855 to 1700. It is supplied as a 40% solution in a 95/5 toluene/methyl cellosolve mix by Rohm & Haas Co.

The above materials are mixed and reduced to spray viscosity (#1 Zahn Cup, 40 Secs.) with a 1:1 mixture of toluene and butyl acetate.

The formulation is applied to a glass substrate and cured by exposure to electron beam irradiation (9 Mrad dose) as in previous examples. B. An aluminum layer is deposited on the base coat by conventional vacuum deposition.

C. The same top coat as employed in Example XXIII, except for the use of 4.0 parts of diethylmethacryloyloxyethyl phosphate as the organophosphate additive, is sprayed on the vacuum-deposited metal and cured by electron beam irradiation.

The plural coated article passes the cross-hatch adhesion test as well as the water and aqueous salt solution exposure tests at 240 hours and resists over 50 rubs with a cloth soaked in methyl ethyl ketone.

EXAMPLE XXV

A plural coated article including a vacuum deposited metal layer is prepared as follows:

A. A base coat having the following formulation is

|     | Parts by Weight |
| --- | --- |
| (1) Acryloid B-44 | 57.0 |
| (2) trimethylolpropane triacrylate | 14.3 |
| (3) neopentylglycoldiacrylate | 9.5 |
| (4) 2-ethylhexyl acrylate | 19.2 |
| (5) 2-methacryloyloxyethyl phosphate | 0.4 |

The above materials are mixed and the formulation reduced to spray viscosity (#1 Zahn Cup, 40 secs.) with a mixture of 1:1 toluene and butyl acetate. The formulation is then sprayed on a plastic substrate and cured by electron beam irradiation (9 Mrad dose).

B. An aluminum layer is deposited on the base coat by conventional vacuum deposition technique.

C. A top coat, which is the same as that applied in Example XXII except that 3.0 parts of diethylmethacryloyloxyethyl phosphate are employed, is sprayed on the vacuum metallized surface and cured by electron beam irradiation (9 Mrad dose).

The plural coated article passes the cross-hatch adhesion test as well as the water and aqueous salt solution exposure tests at 240 hours and resist in excess of 50 rubs with a cloth soaked in methyl ethyl ketone.

EXAMPLE XXVI

A plural coated article including a vacuum deposited metal layer is prepared as follows:

A. A base coat having the same formulation as that of Example XXV except for the use of tris (methacryloyloxyethyl) phosphate, 7.0 parts, is sprayed on a plastic substrate.

B. An antimony layer is deposited on the base coat by conventional vacuum deposition.

C. A top coat having the same formulation as that used in Example XXIV except that .6 parts of methyl (2-methacryloyloxyethyl) phosphate is substituted for the phosphate ester is sprayed on the vacuum metallized surface and cured by electron beam irradiation (9 Mrad dose).

The resultant article withstands a minimum of 50 rubs with a methyl ethyl ketone soaked cloth as well as 240 hours exposure to water at 90° F and 5% aqueous salt solution and also passes to cross-hatch tape adhesion test.

EXAMPLE XXVII

The procedure of Example XXIII is repeated with the exception that 0.4 parts of di(2-methacryloyloxyethyl) phosphate are included in the base coat formulation. The plural coated articles are comparable to those of Example XXIII.

EXAMPLE XXVIII

The procedure of Example XXV is repeated with the exception that 0.8 parts of methyl acryloyloxyethyl phosphate are included in the base coat formulation as the phosphate ester. The plural coated articles are of comparable quality with those of Example XXV.

EXAMPLE XXIX

The procedure of Example XXVI is repeated with the exception that 5.0 parts of diethyl acryloyloxyethyl phosphate are included in the base coat as the organophosphate component. The plural coated articles are comparable to those of Example XXVI.

EXAMPLE XXX

A plural coated article is prepared according to the procedures of Example XXI with the difference that: the metal layer is deposited by sputtering an 80/20 chromium/iron alloy, and that the top coat formulation comprises 50 parts by weight polymer; 25 parts by weight 2-ethylhexylacrylate; 25 parts neopentylglycol diacrylate; and 4.0 parts diethylmethacryloyloxyethyl phosphate.

It will be understood by those skilled in the art that modifications can be made in the foregoing examples and within the scope of the invention as hereinbefore described and hereafter claimed.

We claim:

1. An article of manufacture comprising a substrate and an adherent layer of a radiation polymerized paint on the surface thereof, said paint, on a non-polymerizable solvent, pigment, initiator and particulate filler-free basis, consisting essentially of the in situ formed polymerization product of a film-forming solution of: (1) betwween about 90 and about 10 parts of a saturated, thermoplastic vinyl polymer having a number average molecular weight ranging from about 2,000 to about 250,000 and being prepared from at least about 85 weight percent of monofunctional vinyl monomers; (2) between about 10 and about 90 parts of vinyl monomer solvent for said polymer up to 90 weight percent of said solvent being monovinyl monomers with the remainder being selected from the group consisting of divinyl monomers, trivinyl monomers, tetravinyl monomers and mixtures thereof; and (3) between about 1.0 and about 15.0 parts per 100 parts of the total of said thermoplastic vinyl polymer and said vinyl solvent monomers of a triester of phosphoric acid bearing one or more sites of vinyl unsaturation and having the formula:

$$[H_2C=\overset{R}{\underset{|}{C}}-\overset{O}{\underset{\|}{C}}-O-A-O]_m-\overset{O}{\underset{\|}{P}}[OR']_{3-m} \quad m=1, 2 \text{ or } 3$$

where:
R = H, Cl, CH$_3$
A = C$_n$H$_{2n}$, $2 \leq n \leq 6$
R' = C$_1$ to C$_4$ alkyl or C$_1$ to C$_4$ chloro- or bromoalkyl.

2. An article in accordance with claim 1 wherein the surface to which the radiation polymerized paint is adhered comprises a vapor deposited metal layer.

3. An article in accordance with claim 2 wherein said vapor deposited metal is stainless steel.

4. An article in accordance with claim 2 wherein said vapor deposited metal is aluminum.

5. A process for making an abrasion and corrosion resistant plural coated article comprising:
A. Coating of surface of a substrate with a base coat composition;
B. Curing the base coat composition to form a film;
C. Vapor depositing a layer of metal on the surface of said base coat composition film;
D. Coating the metal bearing surface with a top coat composition which, exclusive of non-polymerizable solvents, pigments, initiators and other non-reactive components, consists essentially of: (1) between about 90 and about 10 parts of a saturated, thermoplastic, vinyl polymer prepared from at least about 85 weight percent of monofunctional vinyl monomers; (2) between about 10 and about 90 parts of vinyl solvent monomers for said vinyl polymer, at least about 10 weight percent of said solvent monomers being selected from the group consisting of divinyl monomers, trivinyl monomers, tetravinyl monomers and mixtures thereof; and (3) between about 1.0 and about 15.0 parts per 100 parts of the total of said thermoplastic vinyl polymer and said vinyl solvent monomers of a mono- or diester of phosphoric acid bearing one or more sites of vinyl unsaturation an having the formula:

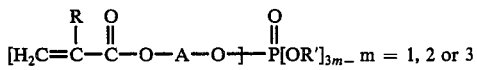
$$[H_2C=\overset{R}{\underset{|}{C}}-\overset{O}{\underset{||}{C}}-O-A-O]_m-\overset{O}{\underset{||}{P}}[OR']_{3-m} \quad m = 1, 2 \text{ or } 3$$

where:
R = H, Cl or CH$_3$
A = C$_n$H$_{2n}$, $2 \leq n \leq 6$
R' = C$_1$ to C$_4$ chloro- or bromo- alkyl or C$_1$ to C$_4$ alkyl
E. Curing the top coat composition to form a film by exposure to radiation.

6. A process in accordance with claim 5 wherein said top coat composition is cured by exposure to ionizing radiation.

7. A process in accordance with claim 5 wherein said top coat composition contains a photoinitiator and is cured by exposure to ultraviolet light.

8. A process in accordance with claim 5 wherein said base coat composition is a lacquer comprising a curable or fusible resin in a volatile solvent.

9. A process in accordance with claim 5 wherein said base coat composition, exclusive of non-polymerizable solvents, pigments, initiators and other nonreactive components, consists essentially of (1) between about 90 and about 10 parts of a saturated, thermoplastic, vinyl polymer prepared from at least about 85 weight percent of monofunctional vinyl monomers and (2) between about 10 and about 90 parts of vinyl solvent monomers for said vinyl polymer, at least about 10 weight percent of said solvent monomers being selected from the group consisting of divinyl monomers, trivinyl monomers, tetravinyl monomers and mixtures thereof.

10. A process in accordance with claim 5 wherein said base coat composition, exclusive of non-polymerizable solvent, pigments, initiators and other non-reactive components, consists essentially of (1) between about 90 and about 10 parts of a saturated thermoplastic, vinyl polymer prepared from at least about 85 weight percent of monofunctional vinyl monomer units; (2) between about 10 and about 90 parts of vinyl solvent monomers for said vinyl polymer, at least about 10 weight percent of said solvent monomers, being selected from the group consisting of divinyl monomers, trivinyl monomers, tetravinyl monomers and mixtures thereof; and (3) between about .05 and about 1.0 parts per 100 parts of the total of said thermoplastic vinyl polymer and said vinyl solvent monomers of a mono- or diester of phosphoric acid bearing one or more sites of vinyl unsaturation and having the formula:

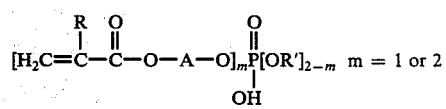
$$[H_2C=\overset{R}{\underset{|}{C}}-\overset{O}{\underset{||}{C}}-O-A-O]_m\overset{O}{\underset{\underset{OH}{|}}{P}}[OR']_{2-m} \quad m = 1 \text{ or } 2$$

where:
R = H, Cl or CH$_3$
A = C$_n$H$_{2n}$, $2 \leq n \leq 6$

R' = H, C$_1$ to C$_4$ alkyl or C$_1$ to C$_4$ chloro- or bromo-alkyl.

11. A process in accordance with claim 5 wherein said base coat composition, exclusive of non-polymerizable solvents, pigments, initiators and other non-reactive components, consists essentially of (1) between about 90 and about 10 parts of a saturated thermoplastic, vinyl polymer prepared from at least about 85 weight percent of monofunctional vinyl monomer units; (2) between about 10 and about 90 parts of vinyl solvent monomers for said vinyl polymer, at least about 10 weight percent of said solvent monomers being selected from the group consisting of divinyl monomers, trivinyl monomers, tetravinyl monomers and mixture thereof; and (3) between about 1.0 and about 15.0 parts per 100 parts of the total of said thermoplastic vinyl polymer and said vinyl solvent monomers of a triester of phosphoric acid bearing one or more sites of vinyl unsaturation and having the formula:

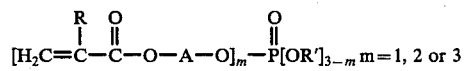
$$[H_2C=\overset{R}{\underset{|}{C}}-\overset{O}{\underset{||}{C}}-O-A-O]_m-\overset{O}{\underset{||}{P}}[OR']_{3-m} \quad m = 1, 2 \text{ or } 3$$

where:
R = H, Cl or CH$_3$
A = C$_n$H$_{2n}$, $2 \leq n \leq 6$
R' = C$_1$ to C$_4$ alkyl or C$_1$ to C$_4$ chloro- or bromo-alkyl.

12. A process in accordance with claim 5 wherein said base coat composition, exclusive of non-polymerizable solvents, pigments and other non-reactive components, consists essentially of: (1) between about 90 and about 10 parts of an alpha-beta olefinically unsaturated urethane modified organic resin; and (2) between about 10 and about 90 parts of vinyl solvent monomers.

13. A plural coated abrasion and corrosion resistant article comprising:
A. a substrate;
B. a base coat film on a surface of said substrate;
C. a layer of metal on the surface of said base coat film; and
D. a top coat film on said metal layer, said top coat film comprising the in situ formed polymerization product of a solution which, exclusive of non-polymerizable solvents, pigments and other non-reactive components, consists essentially of: (1) between about 90 and about 10 parts of a saturated thermoplastic, vinyl polymer prepared from at least about 85 weight percent of monofunctional vinyl monomers; (2) between about 10 and about 90 parts of vinyl solvent monomers for said vinyl polymer, at least about 10 weight percent of said solvent monomers being selected from the group consisting of divinyl monomers, trivinyl monomers, tetravinyl monomers and mixtures thereof; and (3) between about 1.0 and about 15.0 parts per 100 parts of the total of said thermoplastic vinyl polymer and said vinyl solvent monomers of a mono- or diester of phosphoric acid bearing one or more sites of vinyl unsaturation and having the formula

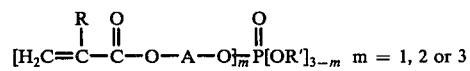
$$[H_2C=\overset{R}{\underset{|}{C}}-\overset{O}{\underset{||}{C}}-O-A-O]_m-\overset{O}{\underset{||}{P}}[OR']_{3-m} \quad m = 1, 2 \text{ or } 3$$

where:

R = H, Cl or CH₃
A = $C_nH_{2n}$, 2 - n - 6
R' = C₁ to C₄ alkyl or C₁ to C₄ chloro- or bromo- alkyl 14. An article in accordance with claim 13 wherein said layer of metal is vapor deposited.

15. An article in accordance with claim 13 wherein said base coat film is the in situ cured product of a lacquer comprising a curable or fusible resin in a volatile solvent.

16. An article in accordance with claim 13 wherein said base coat film is the in situ formed polymerization produce of a solution which, exclusive of non-polymerizable solvent, pigments and other non-reactive components, consists essentially of (1) between about 90 and about 10 parts of a saturated, themoplastic, vinyl polymer prepared from at least about 85 weight percent of monofunctional vinyl monomers and (2) between about 10 and about 90 parts of vinyl solvent monomers for said vinyl polymer, at least about 10 weight percent of said solvent monomers being selected from the group consisting of divinyl monomers, trivinyl monomers, tetravinyl monomers and mixtures thereof.

17. An article in accordance with claim 13 wherein said base coat film comprises the in situ formed polymerization product of solution which, exclusive of non-polymerizable solvent, pigments and other non-reactive components, consists essentially of (1) between about 90 and about 10 parts of a saturated thermoplastic, vinyl polymer prepared from at least about 85 weight percent of monofunctional vinyl monomer units; (2) between about 10 and about 90 parts of vinyl solvent monomers for said vinyl polymer, at least about 10 weight percent of said solvent monomers being selected from the group consisting of divinyl monomers, trivinyl monomers, tetravinyl monomers and mixtures thereof; and (3) between about 0.05 and about 1.0 parts per 100 parts of the total of said thermoplastic polymer and said vinyl solvent monomers of a mono- or diester of phosphoric acid bearing one or more sites of vinyl unsaturation and having the formula:

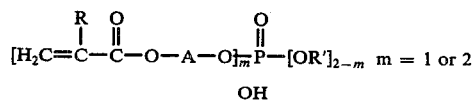

where:
R = H, Cl or CH₃
A = $C_nH_{2n}$, $2 \leq n \leq 6$
R' = H, C₁ to C₄ alkyl or C₁ to C₄ chloro- or bromo- alkyl.

18. An article in accordance with claim 13 wherein said base coat film comprises the in situ formed polymerization produce of a solution which, exclusive of non-polymerizable solvents, pigments and other non-reactive components, consists essentially of (1) between about 90 and about 10 parts of a saturated thermoplastic, vinyl polymer prepared from at least about 85 weight percent of monofunctional vinyl monomer units; (2) between about 10 and about 90 parts of vinyl solvent monomers for said vinyl polymer, at least about 10 weight percent of said solvent monomers being selected from the group consisting of divinyl monomers, trivinyl monomers, tetravinyl monomers and mixtures thereof; and (3) between about 1.0 and about 15.0 parts per 100 parts of the total of said thermoplastic polymer and said vinyl solvent monomers of a triester of phosphoric acid bearing one or more sites of vinyl unsaturation and having the formula

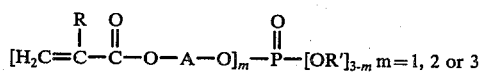

where:
R = H, Cl or CH₃
A = $C_nH_{2n}$, $2 \leq n \leq 6$
R' = C₁ to C₄ alky or C₁ to C₄ chloro- or bromo- alkyl.

19. An article in accordance with claim 13 wherein said base coat film comprises the in situ formed polymerization product of a solution which, exclusive of non-polymerizable solvents, pigments and other non-reactive components, consists essentially of (1) between about 90 and about 10 parts of an alpha-beta olefinically unsaturated urethane modified organic resin containing between about .5 and about 5 units of olefinic unsaturation per 1,000 units of molecular weight; and (2) between about 10 and about 90 parts of vinyl solvent monomers.

* * * * *